(12) United States Patent
Darling

(10) Patent No.: US 9,184,452 B2
(45) Date of Patent: Nov. 10, 2015

(54) SOLID FLOW FIELD PLATE WITH END TURNS

(75) Inventor: Robert Mason Darling, South Windsor, CT (US)

(73) Assignees: Audi AG, Ingolstadt (DE); Toyota Jidosha Kabushiki Kaisha, Toyota-shi (JP)

( * ) Notice: Subject to any disclaimer, the term of this patent is extended or adjusted under 35 U.S.C. 154(b) by 59 days.

(21) Appl. No.: 13/805,073

(22) PCT Filed: Jul. 21, 2010

(86) PCT No.: PCT/US2010/042709
§ 371 (c)(1),
(2), (4) Date: Dec. 18, 2012

(87) PCT Pub. No.: WO2012/011899
PCT Pub. Date: Jan. 26, 2012

(65) Prior Publication Data
US 2013/0101923 A1   Apr. 25, 2013

(51) Int. Cl.
*H01M 8/02* (2006.01)
*H01M 8/00* (2006.01)

(52) U.S. Cl.
CPC ............ *H01M 8/0258* (2013.01); *H01M 8/00* (2013.01); *H01M 8/0206* (2013.01); *H01M 8/0234* (2013.01); *H01M 8/0247* (2013.01); *H01M 8/0267* (2013.01); *Y02E 60/50* (2013.01)

(58) Field of Classification Search
CPC .......................... H01M 8/0258; H01M 8/0247
USPC ......................................................... 429/514
See application file for complete search history.

(56) References Cited

U.S. PATENT DOCUMENTS

| | | | |
|---|---|---|---|
| 2002/0114990 A1* | 8/2002 | Fly et al. .......................... | 429/44 |
| 2004/0018412 A1 | 1/2004 | Orsbon et al. | |
| 2005/0064272 A1* | 3/2005 | Frank et al. ..................... | 429/38 |
| 2005/0158599 A1* | 7/2005 | Sugiura et al. .................. | 429/26 |
| 2009/0023046 A1* | 1/2009 | Wang et al. ..................... | 429/35 |
| 2010/0239957 A1 | 9/2010 | Yamamoto et al. | |

FOREIGN PATENT DOCUMENTS

| | | | |
|---|---|---|---|
| JP | 2005302541 | | 10/2005 |
| JP | 2006066172 | | 3/2006 |
| JP | 2007141695 | | 6/2007 |
| JP | 2009-117220 | | 5/2009 |
| JP | 2009117220 | * | 5/2009 |
| JP | 2010129347 | | 6/2010 |
| WO | WO 2007129030 | * | 11/2007 |
| WO | 2010 114555 | | 10/2010 |
| WO | 2010 114556 | | 10/2010 |
| WO | 2010 114558 | | 10/2010 |

OTHER PUBLICATIONS

International Search Report for PCT Application No. PCT/US2010/042709, Apr. 27, 2011.

\* cited by examiner

*Primary Examiner* — Stewart Fraser
*Assistant Examiner* — Olatunji Godo
(74) *Attorney, Agent, or Firm* — Seed IP Law Group PLLC

(57) ABSTRACT

A method of assembly of a fuel cell plate includes forming channels in a body to provide a flow field. A porous media is inserted into the flow field. The fuel cell plate is a non-porous body including a side having the flow field providing a fluid flow path. The porous media is provided in the fluid flow path.

16 Claims, 3 Drawing Sheets

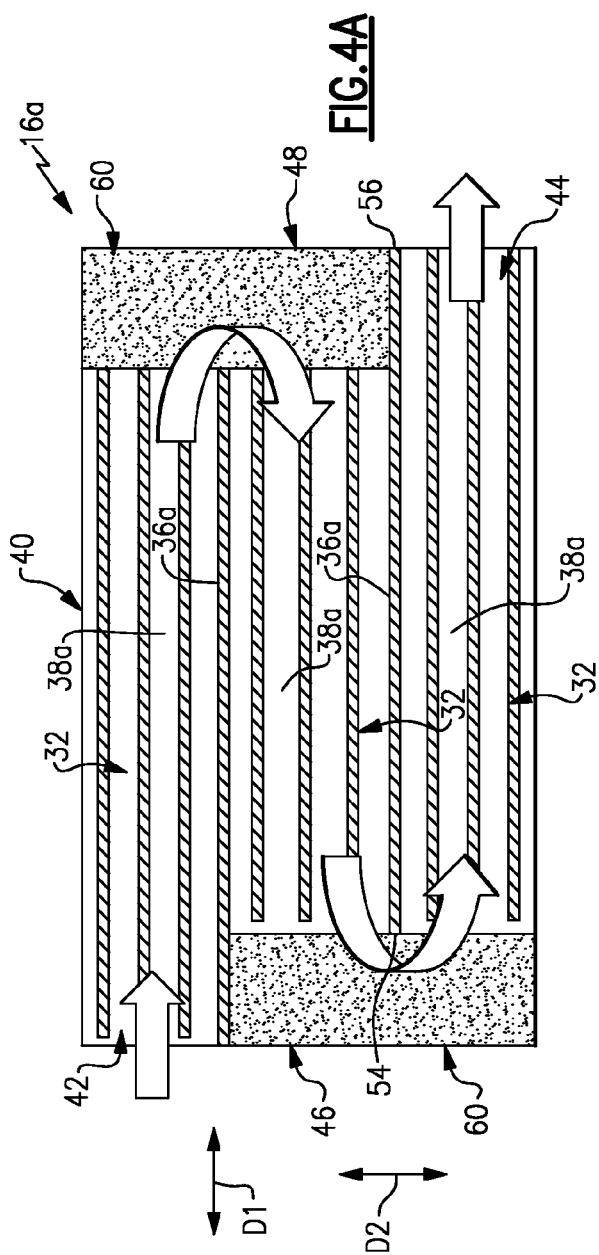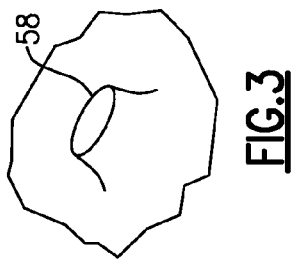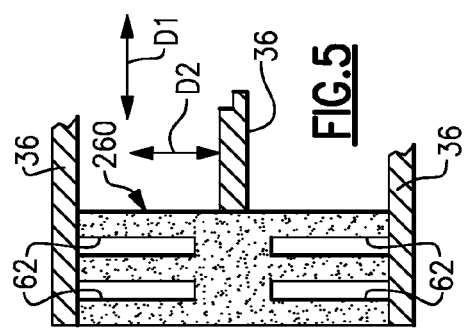

SOLID FLOW FIELD PLATE WITH END TURNS

BACKGROUND

This disclosure relates to flow field plates in a fuel cell. Fuel cells typically include an anode catalyst, a cathode catalyst, and an electrolyte between the anode and cathode catalysts for generating an electric current in a known electrochemical reaction between reactants, such as fuel and oxidant. The fuel cell may include flow field plates with channels for directing the reactants to the respective catalyst. Conventional fuel cells utilize inlet and outlet manifolds to deliver the reactant gases and coolant to the channels and receive exhaust gas and coolant from the channels. The flow field plates are often rectangular, and the inlet and outlet manifolds may be arranged on opposite ends of the plate from one another.

Flow field plates are often designed such that reactants move from one side of the flow field to the other through a first set of channels and turns to flow back across the flow field in another set of channels many times to make at least several passes over the flow field. One challenge associated with a multi-pass design is achieving high fuel cell performance with a configuration that can be stamped. Multi-pass flow field designs in solid plates may employ an embossed feature in the end turns that consists of multiple protrusions. The challenge for these designs is to maintain cell performance which requires good electrical contact and the distribution of fluids to the channels. Failure to achieve these requirements results in poor performance in the flow turn regions which lowers overall cell performance.

SUMMARY

An example flow field plate assembly for use in a fuel cell includes a non-porous plate body having a flow field that extends between first and second ends of the non-porous plate body. The flow field includes a plurality of fluid flow channels having channel inlets and channel outlets, a fluid inlet portion and a fluid outlet portion and in some examples a fluid turn portion.

The flow field may include in the inlet portion, exit portion or turn portion an embossed feature region a region that contains a porous media or a combination of porous media and embossed features to improve the operation of flow field plate. The flow field plate assembly includes at least two elements. The first element is a non-porous plate body having a flow field that includes flow channels and possibly an embossed feature region. This element is typically a manufactured part that has been stamped from a metal blank. The second element is a porous media element that is inserted into the platform of the non-porous plate body as will be shown in more detail.

The end product is a flow field plate assembly that maintains fluid flow distribution without excessive pressure drop.

BRIEF DESCRIPTION OF THE DRAWINGS

The disclosure can be further understood by reference to the following detailed description when considered in connection with the accompanying drawings wherein:

FIG. 3 is an enlarged perspective view of a protrusion used at the end turns.

FIG. 4A is schematic elevation view of the solid plate flow field shown in FIG. 2 with porous media arranged in the end turns.

FIG. 5 is a schematic elevation view of a porous media having slits at the end turns.

DETAILED DESCRIPTION

Figure 1:
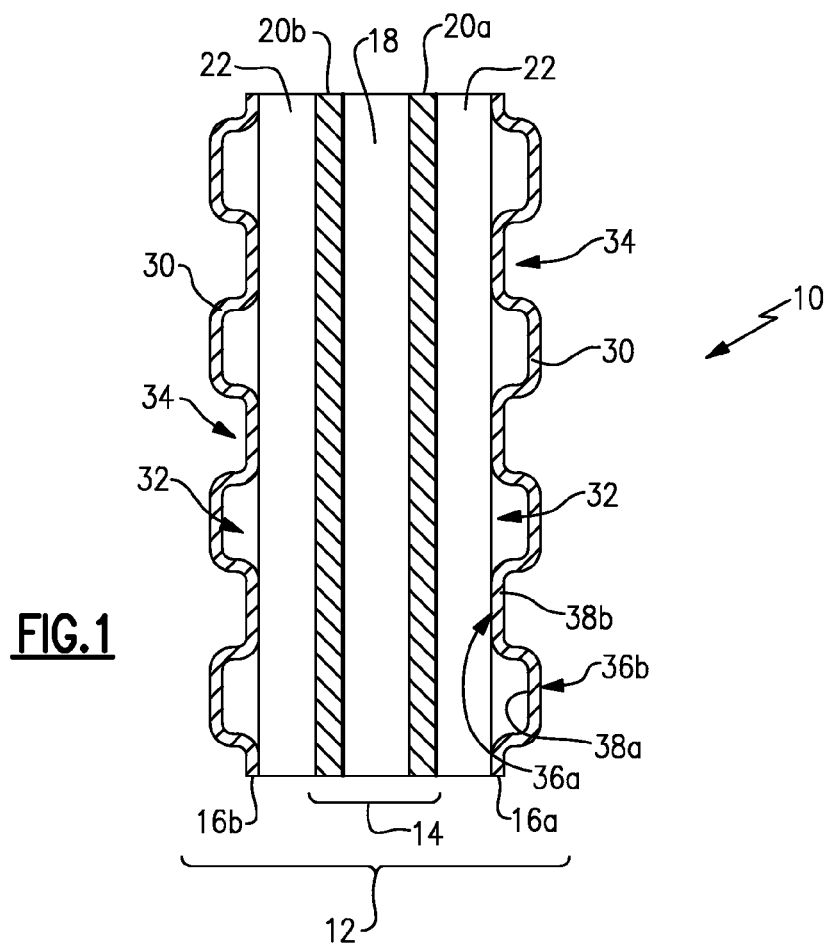
FIG. 1 illustrates an example fuel cell.

FIG. 1 schematically illustrates a portion of an example fuel cell assembly 10 for generating an electric current in a known electrochemical reaction between reactants, for example, hydrogen and air. It is to be understood that the disclosed arrangement of the fuel cell assembly 10 is only an example and that the concepts disclosed herein may be applied to other fuel cell arrangements and applications.

The example fuel cell assembly 10 includes one or more fuel cells 12 that may be stacked in a suitable manner to provide the fuel cell assembly 10. Each of the fuel cells 12 includes a membrane electrode assembly 14 and flow field plates 16a and 16b for delivering reactants (e.g., air and hydrogen) to the membrane electrode assembly 14. The flow field plate 16a may be regarded as an air plate for delivering air in its flow field 32, and the flow field plate 16b may be regarded as a fuel plate for delivering hydrogen in its flow field 32. The flow field plate 16a, flow field plate 16b, or both may also circulate coolant (in coolant channels 34) for maintaining a desired operating temperature of the fuel cell assembly 10 and hydrating the reactant gases indirectly by maintaining the membrane electrode assembly 14 in a desired temperature range. The reactant flow fields 32 face the membrane electrode assembly 14. The coolant flow channels 34 do not allow communication of matter between coolant and the membrane electrode assembly 14.

The membrane electrode assembly 14 includes an electrolyte 18 between a cathode catalyst 20a and an anode catalyst 20b. Gas diffusion layers 22 may be used between the respective flow field plates 16a and 16b and the membrane electrode assembly 14 to facilitate distribution of the reactant gases.

The flow field plates 16a and 16b may be substantially similar. Thus, the disclosed examples made with reference to the flow field plate 16a may also apply to the flow field plate 16b. In other examples, the flow field plate 16b may be different or include some of the same features as the flow field plate 16a. The flow field plates 16a, 16b may be used interchangeably within this disclosure.

The flow field plate 16a includes a non-porous plate body 30. Non-porous refers to the body being solid and free of pores that are known in porous plates for holding or transporting liquid water or other fluids. Thus, the non-porous plate body 30 is a barrier to fluids so that a fluid will not pass from one side of the flow field plate 16a to its other side, that is, between the flow fields 32, 34.

The non-porous plate body 30 includes reactant gas channels 32 and coolant channels 34, for example. The reactant gas channels 32 are located on a side of the flow field plate 16a that faces in the direction of the membrane electrode assembly 14 in the fuel cells 12 and the coolant channels 34 are located on the opposite side of the flow field plate 16a.

The flow field plate 16a may be stamped or otherwise formed into the desired shape to provide the reactant gas channels 32 and coolant channels 34. In one example, positive features on one side of the flow field plate 16a are negative features on the other side, and vice versa. Stamping allows the flow field plate 16a to be made at a relatively low cost with a reduced need for machining operations, for example. The flow field plates 16a, 16b may be formed from any suitable solid material, such as stainless steel, or other suitable alloys or material.

Figure 2:
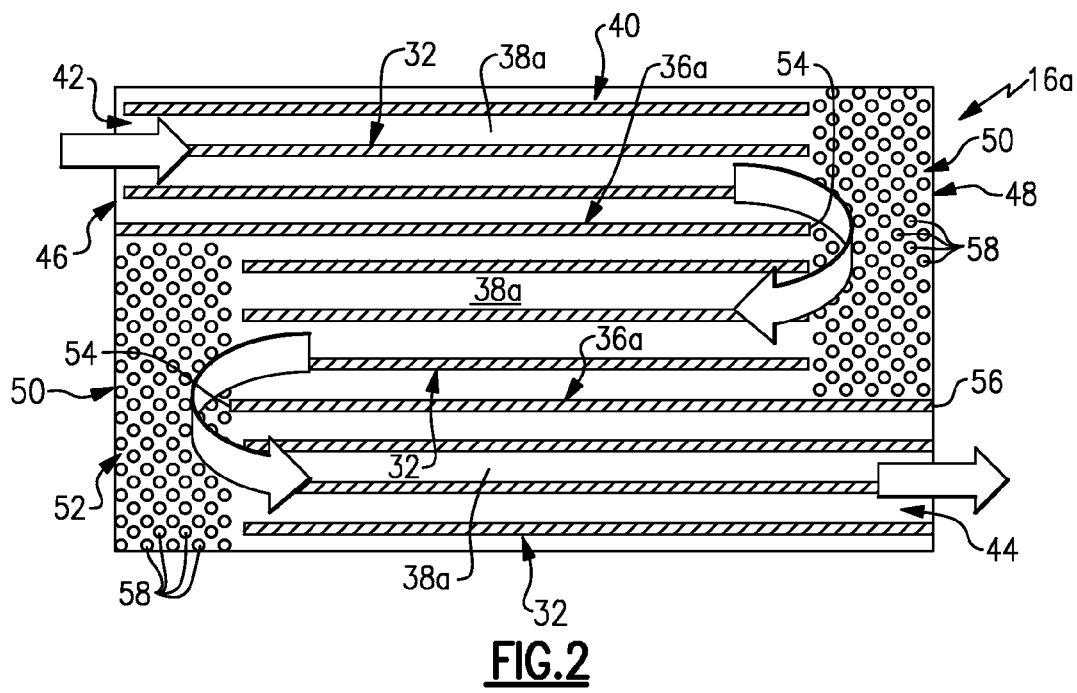
FIG. 2 is a schematic elevation view of a portion of a solid plate flow field with end turns containing embossed feature region.

FIG. 2 schematically is not necessarily to scale and illustrates one side of the flow field plate 16a. It is to be understood that the other side may be the negative of the illustrated side. The flow field 40 has channels 32 providing a fluid flow path with an inlet 42 for receiving a fluid (reactant gas or coolant) and an outlet 44 for discharging the fluid. The flow field plate 16a extends between first and second opposing terminal ends 46, 48 of the non-porous plate body 30, which include the inlet 42 and outlet 44. The term "flow field" as used in this disclosure may refer to any or all of the channels 32 and 34 for delivering the air, fuel, and coolant and any other area between the channels 32 and 34 and manifolds (not shown) for transporting the air, fuel, or coolant. In the examples shown in FIGS. 2 and 4A, there are multiple channels 32 per pass. The plate design may include the multiple passes shown or plate may contain a single pass (FIG. 4B) without a turn or a single turn where the flow field exit and inlet are on the same terminal end.

The flow field 40 includes channels 32 fluidly interconnected by one or more end turns 50. In the example, the end turns 50 are arranged adjacent to terminal ends 46, 48 of the plate. In the example, channels 32 are generally parallel to one another in a direction D1, and the end turns 50 are arranged transverse to the channels 32 in a direction D2, for example, perpendicular to the channels 32. The channels 32 in different passes may be separated by partitions 36a extending outwardly from a bottom surface 38a of the channels 32. The end turn 50 adjoins a terminal end 54 of one partition 36a and a lateral wall 56 of another partition 36a of the adjacent pass. Partition 36a may be of a similar or different width than the normal ribs that separate channels 32. Corresponding bottom surfaces 38b and partitions 36b are provided on the opposing side of the plate 16a.

In one example see FIG. 2, the end turn 50 includes embossed feature region 52 that extend upwardly away from the bottom surface 38a, generally in a same direction as the partitions 36a. The features in the embossed feature region 52, shown in more detail in FIG. 3 as raised dimples 58, cause a decrease in the electrical contact area between the plate 16a and the gas diffusion layer and/or electrode assembly, which comprise a unitized electrode assembly. As a result, the electrical resistance of the fuel cell in the area of the end turns 50 is increased.

Referring to FIG. 4A, a porous media 60 is provided in the fluid flow path of the flow field 40. FIG. 4A illustrates the porous media 60 installed into the embossed feature region illustrated in FIG. 2. The characteristics of the porous media are such that desired gas flow is permitted while maintaining an acceptable pressure drop between the channels 32 through the porous media 60. Typically, this may be achieved by the porous media 60 having a porosity equal to or greater than 70%, for example. Average pore diameter may be equal to or greater than 30 μm, for example. The porous media is electrically and thermally conductive so good cell performance is maintained. In the example, the porous media 60 is disposed in the end turn 50 to improve the electrical contact, making it relatively comparable to the interior of the flow field at the end turn 50. The embossed feature region 52 may be omitted, if desired. The porous media 60 is carbon paper, for example, and in one example carbon paper manufactured by Toray.

Figure 4B:
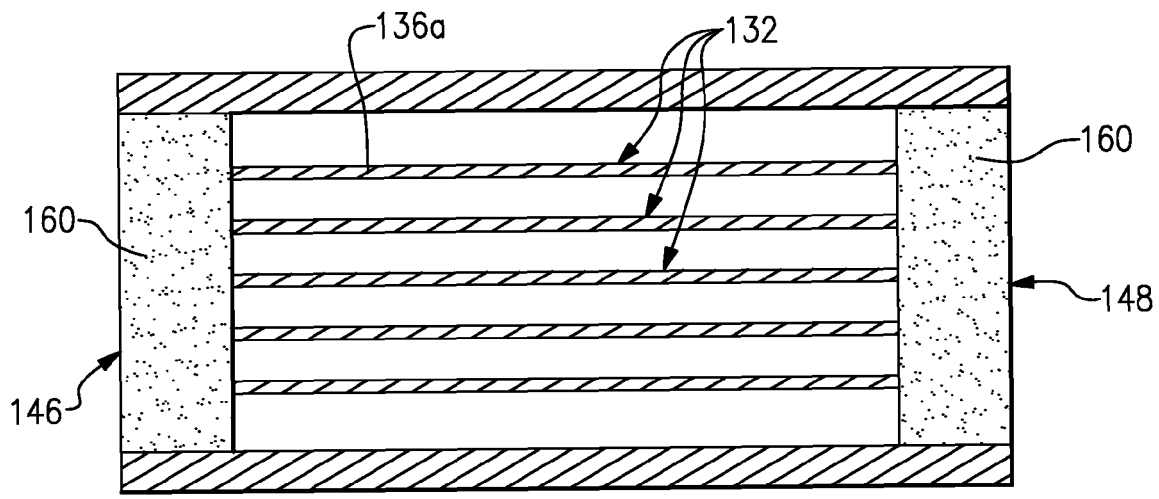
FIG. 4B is a single pass, solid plate flow field having porous media at the ends.

Referring to FIG. 4B, a single pass arrangement is shown having porous media 160 arranged in the region at each of the terminal ends 146, 148, which correspond to a channel inlet and a channel outlet.

The porous media 260 may include at least one slot 62, as shown in FIG. 5, to reduce the pressure drop created by the porous media 260 and improve flow distribution. In the example, multiple slots 62 are arranged transverse to the channels 32, for example, in the direction D2, which is perpendicular to the direction D1 of the channels 32.

Figure 6:
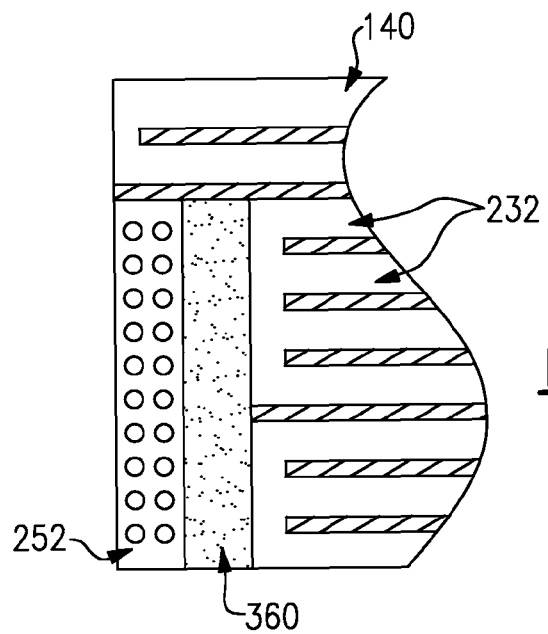
FIG. 6 is a schematic elevation view of a solid plate flow field that includes a combination of porous media and an embossed feature region in the end turns.

Referring to FIG. 6, a region that contains a combination of porous media 360 and embossed feature region 252 is provided in the fluid flow path of the flow field 40. The combination shown has a ratio of about 50% for each section. This is one ratio that is expected to provide beneficial flow distribution while maintaining an acceptable pressure drop. However, other ratios may be used as required for a particular configuration of porous media between the embossed feature region 252 and the channels 232.

According to one example assembly method, the fuel cell plate 16a is manufactured by forming channels 32 in a body, which is non-porous, for example, to provide a flow field 40. A porous media is inserted into the flow field, for example at an end turn.

Although an example embodiment has been disclosed, a worker of ordinary skill in this art would recognize that certain modifications would come within the scope of the claims. For that reason, the following claims should be studied to determine their true scope and content.

What is claimed is:

1. A flow field plate assembly for use in a fuel cell, comprising:
   a plate body having:
      a reactant inlet at a first end of the plate body;
      a reactant outlet at a second end of the plate body, the first end being opposite to the second end;
      a non-porous region that defines a reactant flow path that extends between the reactant inlet and the reactant outlet; and
      a first end turn and a second end turn, the first end turn being at the second end of the plate body and the second end turn being at the first end of the plate body, the first end turn being separated from the second end turn by the non-porous region, the first end turn and the second end turn each including a plurality of protrusions extending from the plate body and porous media adjacent to the plurality of protrusions within the reactant flow path.

2. The assembly according to claim 1, wherein the first end turn and the second end turn are each arranged transverse to an axis extending from the first end to the second end of the plate body.

3. The assembly according to claim 1, wherein the porous media has a porosity of at least 70% and an average pore diameter of at least 30 μm.

4. The assembly according to claim 1, wherein the porous media is carbon paper.

5. The assembly according to claim 1, wherein the porous media includes at least one slot arranged transverse to an axis extending from the first end to the second end of the plate body.

6. The assembly according to claim 1, wherein the plate body is metallic.

7. The assembly according to claim 1, further comprising an electrode assembly adjacent to the porous media.

8. The assembly according to claim 1, wherein:
approximately 50% of the first end turn includes the porous media and approximately 50% of the first end turn includes the protrusions but not the porous media; and
approximately 50% of the second end turn includes the porous media and approximately 50% of the second end turn includes the protrusions but not the porous media.

9. A flow field plate for use in a fuel cell, comprising:
a non-porous body that forms a reactant flow path extending from a reactant inlet at a first end of the non-porous body, through a first end turn at a second end of the non-porous body, through a second end turn at the first end of the non-porous body, to a reactant outlet at the second end of the non-porous body; and
a plurality of protrusions and a porous media provided in the reactant flow path within each of the first and the second end turns.

10. The flow field plate according to claim 9, wherein the porous media has a porosity of at least 70% and an average pore diameter of at least 30 μm.

11. The flow field plate according to claim 9, wherein the first end turn and the second end turn are each arranged transverse to an axis extending from the first end to the second end of the non-porous body.

12. The flow field plate according to claim 9, wherein the porous media is carbon paper.

13. The flow field plate according to claim 9, wherein the porous media includes at least one slot arranged transverse to an axis extending from the first end to the second end of the non-porous body.

14. The flow field plate according to claim 9, wherein the non-porous body is metallic.

15. The flow field plate according to claim 9, further comprising an electrode assembly adjacent to the porous media.

16. The flow field plate according to claim 9, wherein:
approximately 50% of the first end turn includes the porous media and approximately 50% of the first end turn includes the protrusions but not the porous media; and
approximately 50% of the second end turn includes the porous media and approximately 50% of the second end turn includes the protrusions but not the porous media.

\* \* \* \* \*